United States Patent
North et al.

(10) Patent No.: US 10,684,988 B2
(45) Date of Patent: Jun. 16, 2020

(54) AUTOMATED RF DATASET CREATION

(71) Applicant: KickView Corporation, Centennial, CO (US)

(72) Inventors: Robert L. North, Centennial, CO (US); Krishna Karra, Denver, CO (US); Aaron Jones, Parker, CO (US); David R. Ohm, Lone Tree, CO (US)

(73) Assignee: KickView Corporation, Greenwood Village, CO (US)

( * ) Notice: Subject to any disclaimer, the term of this patent is extended or adjusted under 35 U.S.C. 154(b) by 240 days.

(21) Appl. No.: 15/833,867

(22) Filed: Dec. 6, 2017

(65) Prior Publication Data

US 2019/0171722 A1 Jun. 6, 2019

(51) Int. Cl.
*G06F 16/16* (2019.01)
*G06N 20/00* (2019.01)
*G06F 16/11* (2019.01)
*H04B 1/00* (2006.01)

(52) U.S. Cl.
CPC .......... *G06F 16/164* (2019.01); *G06F 16/128* (2019.01); *G06N 20/00* (2019.01); *H04B 1/0028* (2013.01); *H04B 1/0003* (2013.01)

(58) Field of Classification Search
CPC .. H04B 1/0003; H04B 1/0007; H04B 1/0014; H04B 1/0017; H04B 1/0039; H04B 1/0042; H04B 1/0071; H04B 1/0075; H04B 1/06; H04B 1/16; H04B 1/22; H04B 1/0028; H04L 27/06; H04L 27/14; H04L 27/38; H04L 27/3818; H04L 27/3845; H04L 27/3881; G06F 16/128; G06F 16/14; G06F 16/164; G06N 20/00

USPC ................ 375/316, 324–326, 340, 343–345; 455/181.1, 182.1, 182.2, 183.2, 192.1, 455/192.2, 231, 232.1, 334, 33, 7, 337
See application file for complete search history.

(56) References Cited

U.S. PATENT DOCUMENTS

| | | | |
|---|---|---|---|
| 2005/0010958 A1* | 1/2005 | Rakib | H04L 5/06 725/111 |
| 2006/0224396 A1* | 10/2006 | Le Cam | G06F 16/284 705/1.1 |
| 2019/0165827 A1* | 5/2019 | Churan | H04B 1/715 |
| 2019/0171965 A1* | 6/2019 | Ferguson, Jr. | G06N 20/00 |

FOREIGN PATENT DOCUMENTS

WO WO 2012/151651 A1 * 11/2012

\* cited by examiner

*Primary Examiner* — Young T Tse
(74) *Attorney, Agent, or Firm* — Neugeboren O'Dowd PC

(57) ABSTRACT

A radio frequency dataset generation system comprising a software-defined radio, a set of radio frequency collection parameters, a first digital file, a second digital file, and a dataset. The software-defined radio comprises, an analog signal reception device, an analog-to-digital converter, and a digital signal processing system. The set of radio frequency collection parameters are associated with the software-defined radio and correspond to a plurality of analog signal protocols. The first digital file comprises raw signal information corresponding to at least one analog signal received by the analog signal reception device. The second digital file comprises metadata information corresponding to the at least one analog signal received by the analog signal reception device. The dataset comprises the raw signal information time-associated with at least a portion of the metadata information.

18 Claims, 6 Drawing Sheets

| | | | | | | |
|---|---|---|---|---|---|---|
| 1 | 0.000000000 | Cisco-Li_44:4a:29 | -> | Broadcast | 802.11 | 161 Beacon frame, SN=15, FN=0, Flags=........C, BI=100, SSID=KV_DII |
| 2 | 0.080878256 | f8:32:e4:77:82:a8 | -> | Broadcast | 802.11 | 301 Beacon frame, SN=3482, FN=0, Flags=........C, BI=100, SSID=north_24 |
| 3 | 0.101760899 | Cisco-Li_44:4a:29 | -> | Broadcast | 802.11 | 161 Beacon frame, SN=16, FN=0, Flags=........C, BI=100, SSID=KV_DII |
| 4 | 0.204142654 | Cisco-Li_44:4a:29 | -> | Broadcast | 802.11 | 161 Beacon frame, SN=17, FN=0, Flags=........C, BI=100, SSID=KV_DII |
| 5 | 0.306562094 | Cisco-Li_44:4a:29 | -> | Broadcast | 802.11 | 161 Beacon frame, SN=18, FN=0, Flags=........C, BI=100, SSID=KV_DII |
| 6 | 0.369617287 | Cisco-Li_44:4a:29 | -> | da:a1:19:0c:1b:d1 | 802.11 | 155 Probe Response, SN=19, FN=0, Flags=........C, BI=100, SSID=KV_DII |
| 7 | 0.389857127 | Cisco-Li_44:4a:29 | -> | da:a1:19:0c:1b:d1 | 802.11 | 155 Probe Response, SN=20, FN=0, Flags=........C, BI=100, SSID=KV_DII |
| 8 | 0.408960183 | Cisco-Li_44:4a:29 | -> | Broadcast | 802.11 | 161 Beacon frame, SN=21, FN=0, Flags=........C, BI=100, SSID=KV_DII |
| 9 | 0.490672942 | f8:32:e4:77:82:a8 | -> | Broadcast | 802.11 | 301 Beacon frame, SN=3486, FN=0, Flags=........C, BI=100, SSID=north_24 |
| 10 | 0.511338820 | Cisco-Li_44:4a:29 | -> | Broadcast | 802.11 | 161 Beacon frame, SN=22, FN=0, Flags=........C, BI=100, SSID=KV_DII |
| 11 | 0.526631327 | da:a1:19:0c:1b:d1 | -> | Broadcast | 802.11 | 117 Probe Request, SN=44, FN=0, Flags=........C, SSID=Broadcast |
| 12 | 0.527953116 | Cisco-Li_44:4a:29 | -> | da:a1:19:0c:1b:d1 | 802.11 | 155 Probe Response, SN=23, FN=0, Flags=........C, BI=100, SSID=KV_DII |
| 13 | 0.528773445 | | -> | Cisco-Li_44:4a:29 (RA) | 802.11 | 32 Acknowledgement, Flags=........C |
| 14 | 0.546812282 | da:a1:19:0c:1b:d1 | -> | Broadcast | 802.11 | 117 Probe Request, SN=45, FN=0, Flags=........C, SSID=Broadcast |
| 15 | 0.548124331 | Cisco-Li_44:4a:29 | -> | da:a1:19:0c:1b:d1 | 802.11 | 155 Probe Response, SN=24, FN=0, Flags=........C, BI=100, SSID=KV_DII |
| 16 | 0.548447753 | | -> | Cisco-Li_44:4a:29 (RA) | 802.11 | 32 Acknowledgement, Flags=........C |
| 17 | 0.589292264 | da:a1:19:0c:1b:d1 | -> | Broadcast | 802.11 | 117 Probe Request, SN=47, FN=0, Flags=........C, SSID=Broadcast |
| 18 | 0.590508426 | Cisco-Li_44:4a:29 | -> | da:a1:19:0c:1b:d1 | 802.11 | 155 Probe Response, SN=25, FN=0, Flags=........C, BI=100, SSID=KV_DII |
| 19 | 0.590822894 | | -> | Cisco-Li_44:4a:29 (RA) | 802.11 | 32 Acknowledgement, Flags=........C |
| 20 | 0.610713977 | da:a1:19:b6:75:aa | -> | Broadcast | 802.11 | 117 Probe Request, SN=48, FN=0, Flags=........C, SSID=Broadcast |
| 21 | 0.612008153 | Cisco-Li_44:4a:29 | -> | da:a1:19:b6:75:aa | 802.11 | 155 Probe Response, SN=26, FN=0, Flags=........C, BI=100, SSID=KV_DII |
| 22 | 0.612316475 | | -> | Cisco-Li_44:4a:29 (RA) | 802.11 | 32 Acknowledgement, Flags=........C |

FIG. 5

AUTOMATED RF DATASET CREATION

FIELD OF THE INVENTION

This application relates to artificial intelligence and machine learning. In particular, but not intended to limit the invention, this disclosure is related to the automated generation of datasets utilized in association with artificial intelligence and machine learning algorithms.

BACKGROUND OF THE INVENTION

Artificial Intelligence (AI) and Machine Learning (ML) techniques have become popular implementations in a number of applications such as, but not limited to, object detection and facial recognition. The success of these techniques relies upon large quantities of representative labeled data, called datasets, that can be used for training, testing and evaluation of the algorithms implemented by the techniques. The information in the datasets may be more valuable than the associated algorithms since the performance of these algorithms is dependent upon the data provided to the algorithm. Currently, many data collection processes for the information in the datasets comprise manual processes. For example, engineers may be tasked with labeling individual images with the necessary information and/or extracting individual frames from videos.

SUMMARY OF THE INVENTION

In order to quickly provide AI and ML algorithms with accurate datasets, a tool has been developed to automatically create datasets. As AI and ML algorithms may work with radio frequency ("RF" or "rf") data, one embodiment of such an invention comprises a radio frequency dataset generation system. One such system parses out the relevant labels (i.e., metadata) associated with a received communication protocol signal and automatically uses the labels to create datasets associated with the received raw RF signal data, preventing the need to utilize engineers to manually label RF data.

One RF dataset generation system comprises a software-defined radio, a set of radio frequency collection parameters associated with the software-defined radio, first and second digital files, and a dataset. In one such embodiment, the software-defined radio comprises an analog signal reception device, an analog-to-digital converter, and a digital signal processing system. The set of radio frequency collection parameters may correspond to a plurality of analog signal protocols. The first digital file may comprise raw signal information corresponding to at least one analog signal received by the analog signal reception device and the second digital file may comprise metadata information corresponding to the at least one analog signal received by the analog signal reception device. The dataset may comprise the raw signal information time-associated with at least a portion of the metadata information (i.e., "labeled" RF data).

Another embodiment of the invention may comprise a method of automatically generating a labeled radio frequency dataset. One such method comprises selecting one or more collection parameters associated with a software-defined radio. The collection parameters may correspond to at least one analog radio frequency signal protocol. The method may then comprise receiving an analog radio frequency signal at the software-defined radio and using an analog-to-digital converter to convert the analog radio frequency signal to a digital signal. First and second digital files may then be created, with the first digital file comprising raw signal information corresponding to the received radio frequency signal and the second file comprising metadata information corresponding to the received radio frequency signal. The raw signal information at a plurality of first timestamps is correlated with metadata information at a plurality of second timestamps. A labeled dataset may then be created by combining the raw signal information from the first file with time-associated metadata information from the second file.

Yet another embodiment of the invention may comprise a non-transitory tangible processor-readable storage medium encoded with instructions for executing a method for automatically generating a labeled radio frequency signal dataset on a computing device. One such method comprises receiving an analog radio frequency signal and converting the analog radio frequency signal to a digital signal. The method further entails creating a first digital file, with the first digital file comprising raw rf signal burst data corresponding to the received radio frequency signal. The first digital file further comprises a plurality of first timestamps associated with the raw rf signal burst data. A second digital file is also created that corresponds to the received radio frequency signal. The second digital file comprises information related to a plurality of packets with each of the plurality of packets comprising one of a plurality of second timestamps and a label. The method then comprises creating the labeled radio frequency signal dataset by identifying the one of a plurality of second timestamps associated with each of the plurality of first timestamps and associating the label at each identified one of a plurality of second timestamps with the raw rf signal burst data at each of the plurality of first timestamps.

BRIEF DESCRIPTION OF THE DRAWINGS

Various advantages and a more complete understanding of numerous embodiments of the invention are apparent and more readily appreciated by reference to the following Detailed Description and to the appended claims when taken in conjunction with the accompanying Drawings wherein:

FIG. 5 depicts metadata associated with a signal captured by the radio frequency dataset generation system for a specified timeframe according to one embodiment of the invention.

DETAILED DESCRIPTION

Figure 1:
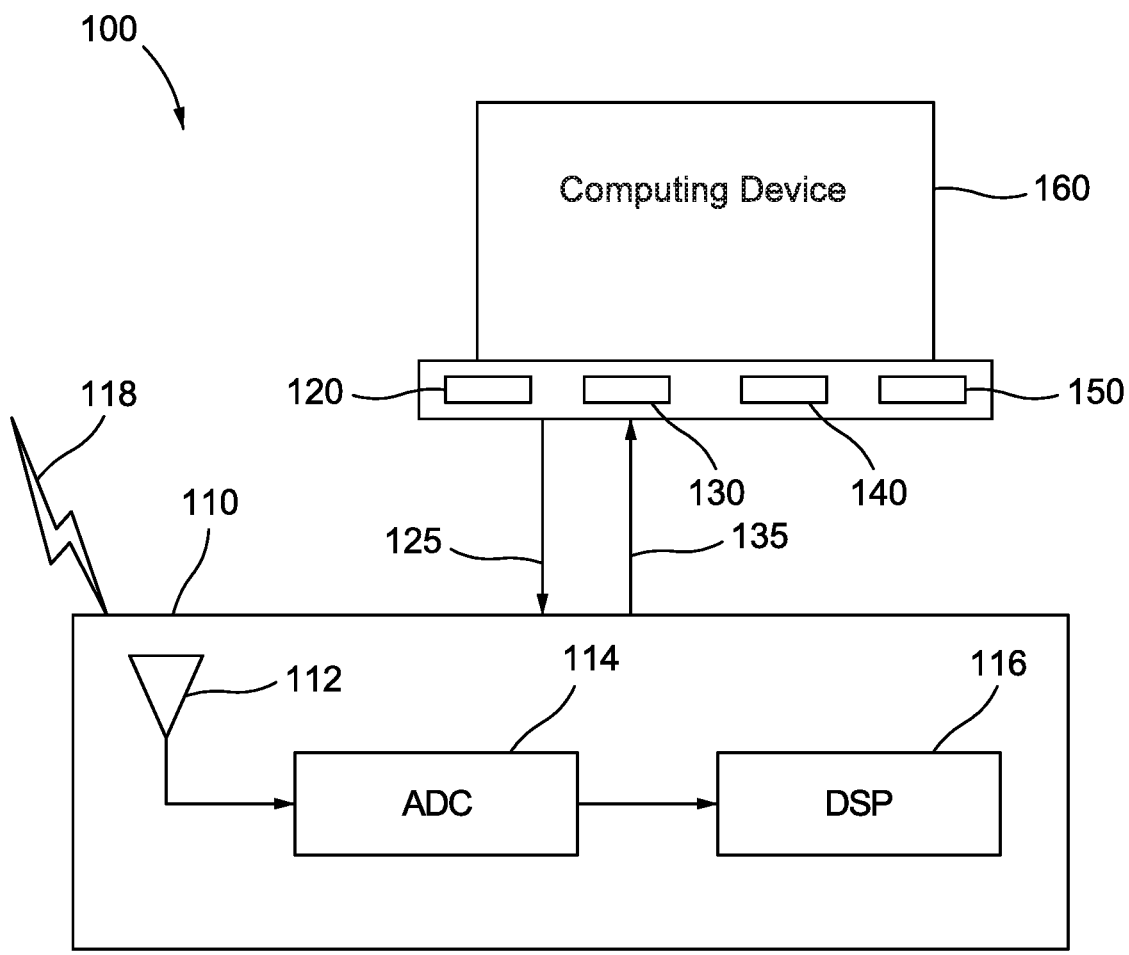
FIG. 1 depicts a radio frequency dataset generation system according to one embodiment of the invention.

Turning first at FIG. 1, seen is a graphical representation of one example of a radio frequency dataset generation system 100. The radio frequency dataset generation system 100 seen in FIG. 1 comprises a software-defined radio 110, a set of radio frequency collection parameters 120, a first digital file 130, a second digital file 140, and a dataset 150. One such software-defined radio 110 may comprise a device from Ettus Research®, located at National Instruments Corp., 4600 Patrick Henry Dr., Santa Clara, Calif. 95054. However, other commercially-available software-defined radios 110 may also be utilized. Although the software-defined radio 110 is only seen comprising an analog signal reception device 112 such as, but not limited to, an antenna, an analog-to-digital converter 114, and a digital signal processing device 116, it is contemplated that the software-defined radio 110 may comprise additional features not seen in FIG. 1. For example, the software-defined radio 110 may also comprise a frequency translation device. Additionally, the digital signal processing device 116 may also be referred to and described herein as a digital signal processing system.

In one representative embodiment (referred to herein as "an embodiment" or "one embodiment"), the radio frequency collection parameters 120, first digital file 130, second digital file 140, and dataset 150 may all be stored on a computing device 160, which may comprise storage and processing components as described with reference to FIG. 6. It is also contemplated that at least a portion of one or more of these items may be located on one or more additional computing devices 160. Furthermore, the system 100 may comprise a radio frequency receiver and an intermediate frequency receiver. Also, one system 100 may receive electromagnetic waves (i.e., radio signals) having a frequency from 0 Hz to around 300 GHz.

In one embodiment, the analog signal reception device 112 may receive an over-the-air radio frequency signal 118 corresponding to one or more radio frequency protocols (i.e., analog signal protocols). One such radio frequency protocol may comprise at least one of 802.11a, 802.11b, 802.11g, 802.11n, 802.11ac, and Bluetooth. Other radio frequency protocols known in the art are contemplated. It is also contemplated that multiple analog signal reception devices 112 may be used to simultaneously capture multiple analog signal protocols or multiple analog signal protocols may be simultaneously captured with a single analog signal reception device 112.

The radio frequency collection parameters 120, also referred to herein as parameters 120 may be accessed via the computing device 160. Each of the parameters 120 may be associated with one or more radio frequency protocols. In one system 100, the computing device 160 may comprise a software application which displays a user interface that enables a user to access the parameters 120. Upon selecting and/or modifying one or more of the parameters 120 via the interface, the computing device 160 may communicate 125 (also referred to herein as a communication 125) with the software-defined radio 110. In this communication 125, the software defined radio 110 may be configured to align with the selected and/or modified parameters 120, enabling the software-defined radio 110 to capture the desired signal protocol or protocols. It is also contemplated that the parameters 120 may be accessed and the communication 125 may be elicited via a command line interface at the computing device 160 or any other interface known in the art. Additionally, the parameters 120 may be located and directly accessed on the software-defined radio 110 in a similar manner. Some of the collection parameters may comprise center frequency, sampling rate, clock rate, decimation factor, antenna selection, gain, and bandwidth. Other collection parameters known in the art are contemplated.

Once the radio frequency collection parameters 120 have been set in the software-defined radio 110, the software-defined radio may begin receiving the signal 118 associated with the parameters 120. Upon receiving the signal 118, the first digital file 130 may be created. It is contemplated that the first digital file 130 may comprise a temporary file (e.g., using a ".tmp" extension or file format) or a generic data file (e.g., using a ".dat" extension or file format), and the second digital file 140 may comprise a text file (e.g., using a ".txt" extension or file format).

For example, upon receiving the signal 118 at the analog signal reception device 112, the signal 118 may be converted to a digital signal with the analog-to-digital converter 114 and the digital signal processing device 116 may convert the digitized signal information to a baseband signal. It is contemplated that the digital signal processing device 116 may comprise a computer processor or processors and/or other hardware accessing software stored in computer memory to digitize and/or process the signal to baseband and store 135 the baseband information in the first digital file 130 on the computing device 160. The digital signal processing device 116 may also be referred to herein as a DSP 116.

Also upon receiving the signal 118 at the analog signal reception device 112, the second digital file 140 is created. In one such embodiment, the incoming digitized raw RF data output by the converter 114 may be analyzed by a software product that reviews packet structure and protocol format of the digitized signal. Such a software product may be included as a portion of the digital signal processing device 116. At least a portion of the digital signal processing device 116 may reside in the computing device 160. Once such software product may comprise a Wireshark® network protocol analyzer tool, provided by Wireshark Foundation, Inc., located at 1949 5$^{th}$ Street, Suite 103, Davis, Calif., 95616. Other products and tools are contemplated. With such a tool, the packets of the digitized signal emitted to the DSP 116 are parsed and at least a portion of their structure and/or metadata are written to the second digital file. Packet structure and/or metadata may comprise and be referred to here as a label since, in the dataset, the metadata/structure associated with the rf burst may comprise the "label."

Figure 4:
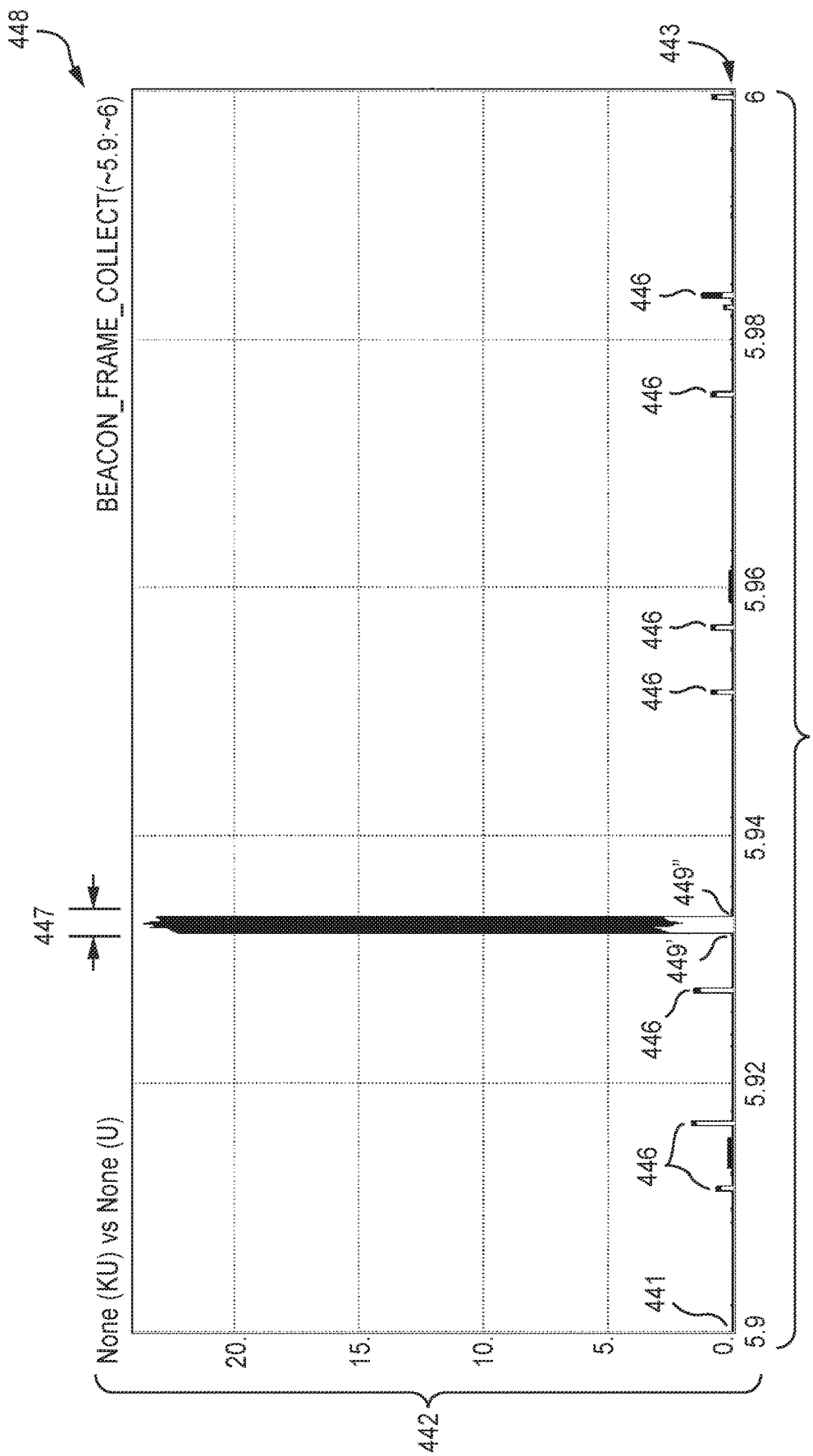
FIG. 4 depicts a plot of a signal captured by the radio frequency dataset generation system for a specified timeframe according to one embodiment of the invention.

The network protocol analyzer tool, or any other software tool residing on the computing device 160 that interfaces with the software-defined radio 110 may create a first digital file 130 comprising a binary file. Such a binary file may comprise a raw RF data file comprising complex-number in-phase and quadrature components for an identified signal duration. Seen in FIG. 4 is one example of a 0.1 second snapshot of an example plot 448 of data in the first digital file 130. The plot 448 seen in FIG. 4 comprises numerous interference pulses 446 having various amplitude 442 and duration 444. The duration 444 may comprise a time period. For example, if the start 441 of the plot is at zero seconds and the end of the plot is at 0.1 second, a large-pulse duration 447 may comprise 1.44 milliseconds. The large-pulse 447 duration may begin at a pulse start time 449' of 0.013 s and a pulse end time 449" of 0.0144 s. The first data file may save this file as hexadecimal data in the first data file 130. Other formats known in the art are also contemplated.

The network protocol analyzer, or other third-party software tool residing on the computing device 160 that interfaces with the software-defined radio 110 may also create the second digital file, which may comprise a text file 551, as seen in FIG. 5. One such software tool may interface with a network adapter on the computing device 160 and/or the software-defined radio 110. The text file 551 seen in FIG. 5 comprises twenty-two separate lines 552 of information, with each individual line referencing metadata for a particular signal burst, which may include the signal pulses 446 seen in FIG. 4. In one embodiment, the information related to the burst of the large-pulse 447 may be included in one of the lines 552 seen in FIG. 5. The metadata 553 in FIG. 5 comprises information such as, but not limited to, a timestamp (i.e., timetag), protocol type, SSID, etc.). The dataset 150 then comprises the information obtained from FIG. 4 associated with the relevant information from FIG. 5.

The raw signal information in the first digital file 130 is time-associated with the packet structure and metadata information in the second digital file 140. For example, the time identified in the received raw signal information may comprise a raw data signal time. The raw data signal time may be obtained from a first timed device. The time identified in the received digitized information may comprise a digital signal time. The digital signal time may be received from a second timed device. The raw signal time may be synchronized with the digital signal time. One first timed device may comprise a clock comprising a part of the analog signal reception device 112 or the software defined radio 110. One second timed device may comprise a clock on a network card. One such network card may comprise a portion of the computing device 160. The times utilized by both devices may by synchronized to a single source. One such source may comprise a network time protocol ("NTP") time server or a global positioning system ("GPS") time computing device such as, but not limited to, a GPS time server.

An energy detector may be utilized to identify the start time of the initial signal burst in the first digital file 130. Such a start time may comprise an initial signal burst start time. Other methods and/or devices may be used to detect the signal bursts. For example, a matched filter may be used to detect the pulses. Other methods and devices known in the art are contemplated. Upon obtaining the initial signal burst start time from the first digital file 130, the start time for metadata information from the second digital file 140 corresponding to the initial signal burst start time may be obtained. The start time for the metadata information corresponding to the initial signal burst start time may comprise an initial metadata start time. The initial signal burst start time and the initial metadata start time obtained from the first digital file 130 and second digital file 140, respectively, comprise the same time. Furthermore, metadata information from the second digital file 140 and a plurality of second metadata times correspond to the raw signal information in the first digital file at a plurality of second raw signal times, so the entirety of the information in the second digital file is associated with the same raw signal time and associated raw signal information in the first digital file. It is contemplated that information comprising multiple time entries in the second digital file may be associated with information in the first digital file having a single time entry. Similarly, multiple entries in the first digital file may be associated with a single entry in the second digital file.

Upon identifying the corresponding metadata and packet header information in the second digital file 140 with the raw burst signal information in the first digital file 130, a dataset 150 may be created. One such dataset comprises a collection of files. For example, the dataset may include a collection of second digital files 140 and first digital files 130, obtained for each snapshot of the signal 118. Each file may comprise a label comprising multiple sets of parameters identifying the associated data. These parameters may comprise numerical values or units related to the burst such as, but not limited to, frequency. Parameters may also comprise associated text such as, but not limited to a network ID or a pulse description. Further parameters may be protocol-related such as, but not limited to, packet type, data frame, or network type. Together, the collection of files displays the raw signal information for an identified period of time or timestamp together with the associated metadata information for the same period of time or timestamp. Such a dataset may be implemented in association with an algorithm for use with a machine-learning and/or an artificial intelligence technique. Each of the first digital file and second digital file may comprise a plurality of times and/or timestamps.

Figure 2:
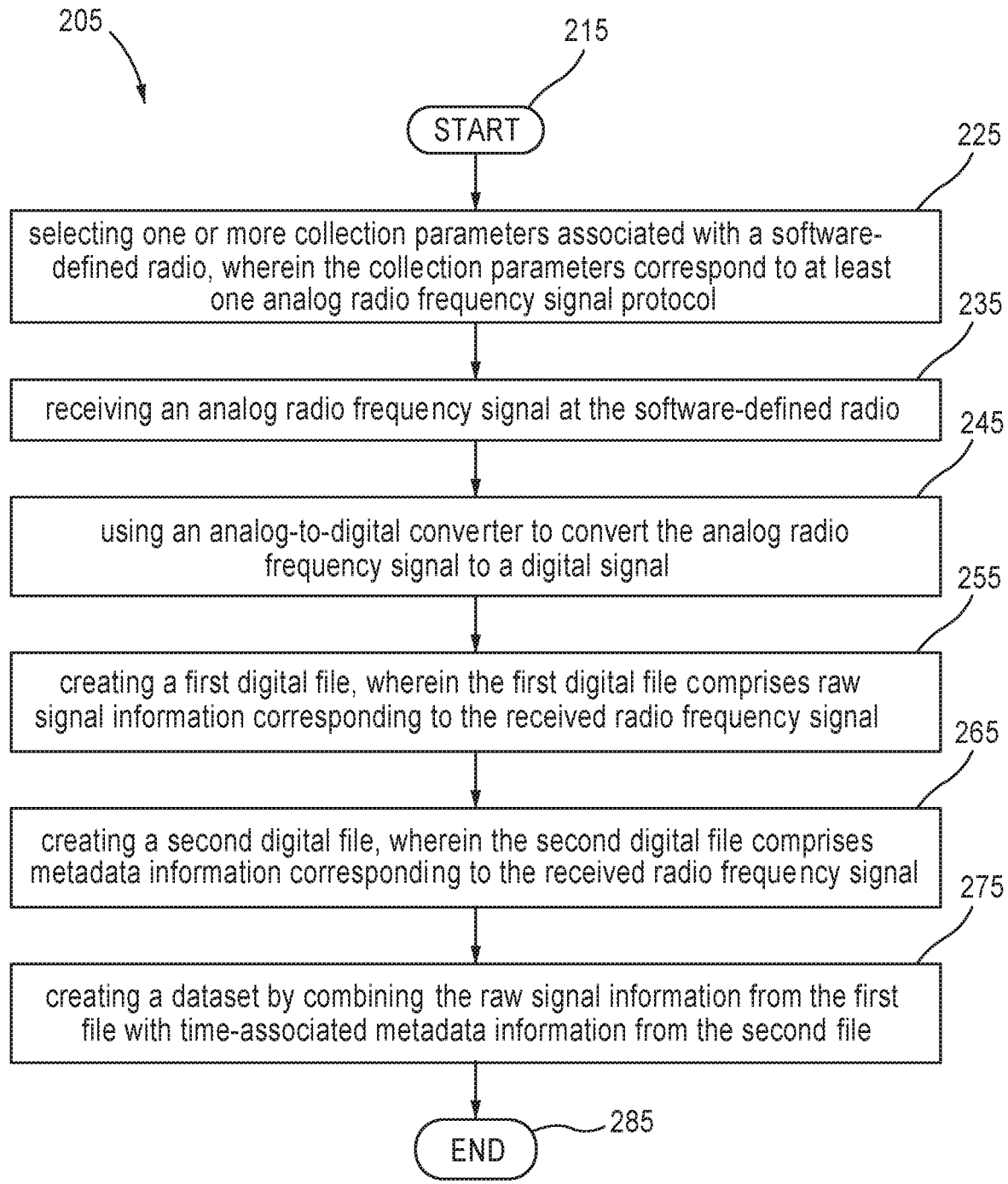
FIG. 2 depicts a method of automatically generating a labeled radio frequency dataset according to one embodiment of the invention.

Turning now to FIG. 2, seen is a method 205 of automatically generating a labeled radio frequency dataset. The method 205 starts at 215 and at 225 one such method 205 comprises selecting one or more collection parameters. Throughout the description of the method 205, reference to FIG. 1 may be utilized to provide an example of aspects of the method 205. However, it is contemplated that the method 205 may relate to different devices and systems than those as described in FIG. 1 and the use of FIG. 1 with reference to the method 205 is not meant to be limiting in any way. For example, the collection parameters 120 described above with reference to FIG. 1 may be utilized. Such collection parameters 120 may be associated with the software-defined radio 110 and may correspond to at least one analog radio frequency signal protocol.

As described above, and as seen at 235 of FIG. 2, upon selecting the appropriate collection parameters 120, the software-defined radio 110 may be modified to receive an analog radio frequency signal 118, for example through the analog signal reception device 112. At 245, the method 205 comprises using an analog-to-digital converter 114 to convert the analog radio frequency signal 118 to a digital signal. At 255 the method 205 comprises creating a first digital file 130. The first digital file 130 may comprise raw signal information corresponding to the received radio frequency signal 118. At 265, the method 205 comprises creating a second digital file 140. One such second digital file 140 comprises metadata information corresponding to the received radio frequency signal 118. At step 275, the method 205 comprises creating a dataset 150 by combining the raw signal information from the first digital file 130 with time-associated metadata information from the second digital file 140. It is contemplated that step 265, creating a second digital file 140, and step 275, creating a dataset, may occur concurrently.

Figure 3:
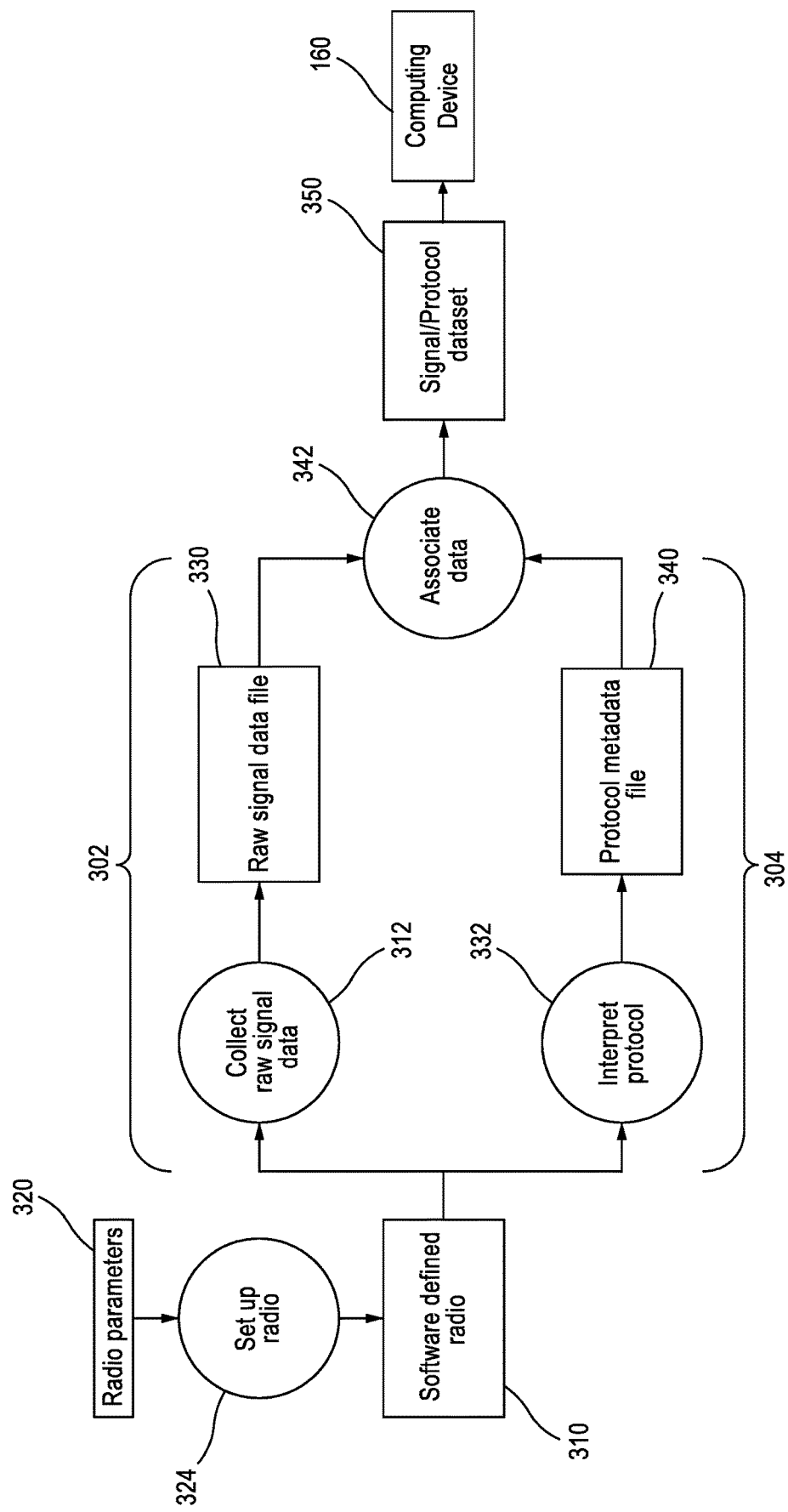
FIG. 3 depicts a flowchart block diagram representing features of the radio frequency dataset generation system and method of automatically generating a labeled radio frequency dataset according to one embodiment of the invention.

It is contemplated that the creation of the first digital file 130 is synchronized in time with the creation of the second digital file 140. For example, turning now to FIG. 3, seen is a first path 302 and second path 304. Creation of the first digital file 330 along the first path 302 may be time-synchronized with the creation of the second digital file 340 along the second path 304. FIG. 3 displays a block diagram representing features of the system 100 and method 205 described herein. For example, the parameters 320 shown in FIG. 3 are displayed as being modified during the setup 324 of the software-defined radio 310. Upon receiving the signal 118, as shown in FIG. 1, the first path 302 and second path 304 are implemented to obtain the first digital file 320 and second digital file 330. Along the first path 302, raw RF signal data is collected 312 and saved to the first digital file 330. Synchronized in time is the second path's 304 steps of interpreting the digital protocol 332 of the signal and extracting the metadata from the packets to the second digital file 340. It is also contemplated that packet header or other information in the packet may be extracted to the second digital file 340. At 342 the data in the first digital file 330 is time-associated with the data in the second digital file 340 and the written to the dataset 350.

It is contemplated that in order to convert the analog signal 118, as seen in FIG. 1, to a digital signal for interpreting the protocol 332 and processing the data packets to create the second digital file 340, the digital signal may be demodulated to a baseband signal after using the analog-to-digital converter 114. It is also contemplated that such demodulation may occur before the analog-to-digital converter 114. Additionally, the first digital file 330 may comprise information related to the baseband signal.

When creating the second digital file 340, upon interpreting the digital signal protocol 332, at least one of packet structure and payload information may be obtained from one or more data packets in the digital signal and placed into the file 340. It is contemplated that the term "payload information" may be referred to herein as "metadata," where appropriate. However, "metadata" may also be referred to herein as "packet structure" or a combination of a portion of "packet structure" and/or "payload information." Metadata associated with each received packet or at least a portion of the metadata associated with at least a portion of the received packets may be stored in the second digital file 340.

It is contemplated that the raw rf signal 118, as seen in FIG. 1, may comprise a burst transmission or data burst rf signal. In such a transmission, or in any other rf signal 118, the metadata information associated with each of the one or more data packets may comprise a timestamp and a packet type. Furthermore, and as described herein with reference to FIGS. 4 and 5, creating a dataset 350 by combining the raw signal information from the first file 330 with time-associated metadata information from the second file 340 may comprise creating a signal snapshot for each timestamp, with the signal snapshot comprising the packet type and the rf signal burst data. Such a signal snapshot may be created for each rf signal burst data within the analog radio frequency signal. The system 100 of FIG. 1 and flowchart block diagram seen in FIG. 3 may also comprise a computing device 160 for accessing the dataset 150, 350 for use with software implementing at least one of a machine learning algorithm and an artificial intelligence algorithm.

Figure 6:
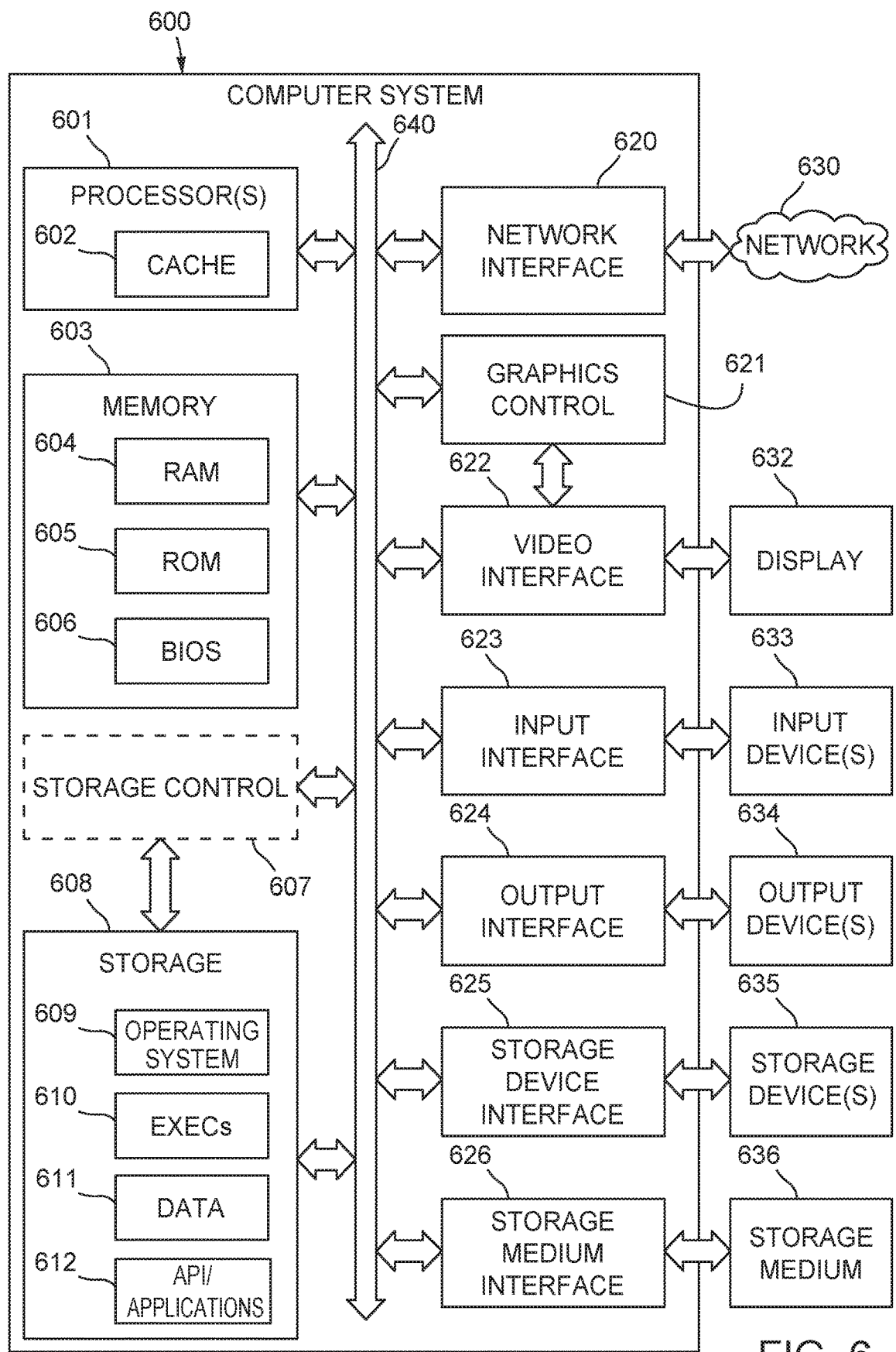
FIG. 6 depicts a diagrammatic representation of a computer system according to one embodiment of the invention.

In addition to the specific embodiments described herein, the systems and methods described herein can be implemented in a computer system such as, but not limited to the FIG. 6 diagrammatic representation of one embodiment of a computer system 600 within which a set of instructions can execute for causing a device to perform or execute any one or more of the aspects and/or methodologies of the present disclosure. Such a computer system 600 may be similar to the computing device 160 described with reference to FIG. 1. Aspects of the computer system 600 may also reside in the software-defined radio 110 and other portions of the system and methods described herein. The components in FIG. 6 are examples only and do not limit the scope of use or functionality of any hardware, software, firmware, embedded logic component, or a combination of two or more such components implementing particular embodiments of this disclosure. Some or all of the illustrated components can be part of the computer system 600. For instance, the computer system 600 can be a general-purpose computer (e.g., a laptop computer) or an embedded logic device (e.g., an FPGA), to name just two non-limiting examples.

Computer system 600 includes at least a processor 601 such as a central processing unit (CPU) or an FPGA to name two non-limiting examples. Any of the subsystems described throughout this disclosure could embody the processor 601. The computer system 600 may also comprise a memory 603 and a storage 608, both communicating with each other, and with other components, via a bus 640. The bus 640 may also link a display 632, one or more input devices 633 (which may, for example, include a keypad, a keyboard, a mouse, a stylus, etc.), one or more output devices 634, one or more storage devices 635, and various non-transitory, tangible computer-readable storage media 636 with each other and/or with one or more of the processor 601, the memory 603, and the storage 608. All of these elements may interface directly or via one or more interfaces or adaptors to the bus 640. For instance, the various non-transitory, tangible computer-readable storage media 636 can interface with the bus 640 via storage medium interface 626. Computer system 600 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 601 (or central processing unit(s) (CPU(s))) optionally contains a cache memory unit 602 for temporary local storage of instructions, data, or computer addresses. Processor(s) 601 are configured to assist in execution of computer-readable instructions stored on at least one non-transitory, tangible computer-readable storage medium. Computer system 600 may provide functionality as a result of the processor(s) 601 executing software embodied in one or more non-transitory, tangible computer-readable storage media, such as memory 603, storage 608, storage devices 635, and/or storage medium 636 (e.g., read only memory (ROM)). Memory 603 may read the software from one or more other non-transitory, tangible computer-readable storage media (such as mass storage device(s) 635, 636) or from one or more other sources through a suitable interface, such as network interface 620. Any of the subsystems herein disclosed could include a network interface such as the network interface 620. The software may cause processor(s) 601 to carry out one or more processes or one or more steps of one or more processes described or illustrated herein. Carrying out such processes or steps may include defining data structures stored in memory 603 and modifying the data structures as directed by the software. In some embodiments, an FPGA can store instructions for carrying out functionality as described in this disclosure. In other embodiments, firmware includes instructions for carrying out functionality as described in this disclosure.

The memory 603 may include various components (e.g., non-transitory, tangible computer-readable storage media) including, but not limited to, a random access memory component (e.g., RAM 1304) (e.g., a static RAM "SRAM", a dynamic RAM "DRAM", etc.), a read-only component (e.g., ROM 605), and any combinations thereof. ROM 605 may act to communicate data and instructions unidirectionally to processor(s) 601, and RAM 604 may act to communicate data and instructions bidirectionally with processor(s) 601. ROM 605 and RAM 604 may include any suitable non-transitory, tangible computer-readable storage media. In some instances, ROM 605 and RAM 604 include non-transitory, tangible computer-readable storage media for carrying out a method. In one example, a basic input/output system 606 (BIOS), including basic routines that help to transfer information between elements within computer system 600, such as during start-up, may be stored in the memory 603.

Fixed storage 608 is connected bi-directionally to processor(s) 601, optionally through storage control unit 607. Fixed storage 608 provides additional data storage capacity and may also include any suitable non-transitory, tangible computer-readable media described herein. Storage 608 may be used to store operating system 609, EXECs 610 (executables), data 611, API applications 612 (application programs), and the like. Often, although not always, storage 608 is a secondary storage medium (such as a hard disk) that is slower than primary storage (e.g., memory 603). Storage 608 can also include an optical disk drive, a solid-state memory device (e.g., flash-based systems), or a combination of any of the above. Information in storage 608 may, in appropriate cases, be incorporated as virtual memory in memory 603.

In one example, storage device(s) 635 may be removably interfaced with computer system 600 (e.g., via an external port connector (not shown)) via a storage device interface 625. Particularly, storage device(s) 635 and an associated machine-readable medium may provide nonvolatile and/or volatile storage of machine-readable instructions, data structures, program modules, and/or other data for the computer system 600. In one example, software may reside, completely or partially, within a machine-readable medium on storage device(s) 635. In another example, software may reside, completely or partially, within processor(s) 601.

Bus 640 connects a wide variety of subsystems. Herein, reference to a bus may encompass one or more digital signal lines serving a common function, where appropriate. Bus 640 may be any of several types of bus structures including, but not limited to, a memory bus, a memory controller, a peripheral bus, a local bus, and any combinations thereof, using any of a variety of bus architectures. As an example, and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 600 may also include an input device 633. In one example, a user of computer system 600 may enter commands and/or other information into computer system 600 via input device(s) 633. Examples of an input device(s) 633 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 633 may be interfaced to bus 640 via any of a variety of input interfaces 623 (e.g., input interface 623) including, but not limited to, serial, parallel, game port, USB, FIREWIRE, THUNDERBOLT, or any combination of the above.

In particular embodiments, when computer system 600 is connected to network 630, computer system 600 may communicate with other devices, such as mobile devices and enterprise systems, connected to network 630. Communications to and from computer system 600 may be sent through network interface 620. For example, network interface 620 may receive incoming communications (such as requests or responses from other devices) in the form of one or more packets (such as Internet Protocol (IP) packets) from network 630, and computer system 600 may store the incoming communications in memory 603 for processing. Computer system 600 may similarly store outgoing communications (such as requests or responses to other devices) in the form of one or more packets in memory 603 and communicated to network 630 from network interface 620. Processor(s) 601 may access these communication packets stored in memory 603 for processing.

Examples of the network interface 620 include, but are not limited to, a network interface card, a modem, and any combination thereof. Examples of a network 630 or network segment 630 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 630, may employ a wired and/or a wireless mode of communication. In general, any network topology may be used.

Information and data can be displayed through a display 632. Examples of a display 632 include, but are not limited to, a liquid crystal display (LCD), an organic liquid crystal display (OLED), a cathode ray tube (CRT), a plasma display, and any combinations thereof. The display 632 can interface to the processor(s) 601, memory 603, and fixed storage 608, as well as other devices, such as input device(s) 633, via the bus 640. The display 632 is linked to the bus 640 via a video interface 622, and transport of data between the display 632 and the bus 640 can be controlled via the graphics control 621.

In addition to a display 632, computer system 600 may include one or more other peripheral output devices 634 including, but not limited to, an audio speaker, a printer, and any combinations thereof. Such peripheral output devices may be connected to the bus 340 via an output interface 624. Examples of an output interface 624 include, but are not limited to, a serial port, a parallel connection, a USB port, a FIREWIRE port, a THUNDERBOLT port, and any combinations thereof.

In addition, or as an alternative, computer system 600 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an IC) storing software for execution, a circuit embodying logic for execution, or both, where appropriate. The present disclosure encompasses any suitable combination of hardware, software, or both.

Those of skill in the art will understand that information and signals may be represented using any of a variety of different technologies and techniques. Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, a software module implemented as digital logic devices, or in a combination of these. A software module may reside in RAM memory, flash memory, ROM memory, EPROM memory, EEPROM memory, registers, hard disk, a removable disk, a CD-ROM, or any other form of non-transitory, tangible computer-readable storage medium known in the art. An exemplary non-transitory, tangible computer-readable storage medium is coupled to the processor such that the processor can read information from, and write information to, the non-transitory, tangible computer-readable storage medium. In the alternative, the non-transitory, tangible computer-readable storage medium may be integral to the processor. The processor and the non-transitory, tangible computer-readable storage medium may reside in an ASIC. The ASIC may reside in a user terminal. In the alternative, the processor and the non-transitory, tangible computer-readable storage medium may reside as discrete components in a user terminal. In some embodiments, a software module may be implemented as digital logic components such as those in an FPGA once programmed with the software module.

It is contemplated that one or more of the components or subcomponents described in relation to the computer system 600 shown in FIG. 6 such as, but not limited to, the network 630, processor 601, memory, 603, etc., may comprise a cloud computing system. In one such system, front-end systems such as input devices 633 may provide information to back-end platforms such as servers (e.g. computer systems 600) and storage (e.g., memory 603). Software (i.e., middleware) may enable interaction between the front-end and back-end systems, with the back-end system providing services and online network storage to multiple front-end clients. For example, a software-as-a-service (SAAS) model may implement such a cloud-computing system. In such a system, users may operate software located on back-end servers through the use of a front-end software application such as, but not limited to, a web browser.

Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A radio frequency dataset generation system comprising:
   a software-defined radio, wherein, the software-defined radio comprises:
      an analog signal reception device,
      an analog-to-digital converter coupled to the analog signal reception device, and
      a digital signal processing system coupled to the analog-to-digital converter;
   a set of radio frequency collection parameters associated with the software-defined radio, wherein the set of radio frequency collection parameters correspond to a plurality of analog signal protocols;
   a first digital file, wherein the first digital file comprises raw signal information corresponding to at least one analog signal received by the analog signal reception device;
   a second digital file, wherein the second digital file comprises metadata information corresponding to the at least one analog signal received by the analog signal reception device; and
   a dataset, wherein the dataset comprises the raw signal information time-associated with at least a portion of the metadata information.

2. The radio frequency dataset generation system of claim 1, wherein the collection parameters comprise one or more of:
   center frequency;
   sampling rate;
   clock rate;
   decimation factor;
   antenna selection;
   gain; and
   bandwidth.

3. The radio frequency dataset generation system of claim 2, wherein, the analog signal reception device comprises at least one of:
   a radio frequency receiver; and
   an intermediate frequency receiver.

4. The radio frequency dataset generation system of claim 1, further comprising a computing device accessing the dataset for use with software implementing at least one of:
   a machine learning algorithm; and
   an artificial intelligence algorithm.

5. The radio frequency dataset generation system of claim 1, wherein the plurality of analog signal protocols comprise one or more of:
   802.11a;
   802.11b;
   802.11g;
   802.11n;
   802.11ac; and
   Bluetooth.

6. The radio frequency dataset generation system of claim 1, wherein the at least a portion of the metadata information comprises a packet label.

7. The radio frequency dataset generation system of claim 1, wherein
   the raw signal information is associated with a plurality of first timestamps;
   the second digital file is associated with a plurality of second timestamps; and
   the dataset associates each of the plurality of first timestamps with the plurality of second timestamps.

8. The radio frequent dataset generation system of claim 1, wherein the analog signal reception device receives electromagnetic waves having a frequency from around 0 Hz to around 300 GHz.

9. A method of automatically generating a labeled radio frequency dataset comprising:
   selecting one or more collection parameters associated with a software-defined radio, wherein the collection parameters correspond to at least one analog radio frequency signal protocol;
   receiving an analog radio frequency signal at the software-defined radio;
   using an analog-to-digital converter to convert the analog radio frequency signal to a digital signal;
   creating a first digital file, wherein the first digital file comprises raw signal information corresponding to the converted radio frequency signal;
   creating a second digital file, wherein the second digital file comprises metadata information corresponding to the converted radio frequency signal;
   correlating the raw signal information at a plurality of first timestamps with the metadata information at a plurality of second timestamps; and
   creating the labeled radio frequency dataset based at least in part on the correlating, wherein the labeled radio frequency dataset comprises the raw signal information from the first digital file with time-associated metadata information from the second digital file.

10. The method of claim 9, wherein,
   the time associated with the plurality of first timestamps is received from a software-defined radio clock;
   the time associated with the plurality of second timestamps is received from a network card clock;
   the software-defined radio clock and the network card clock are synchronized with a single time source; and
   correlating the raw signal information at the plurality of first timestamps with the metadata information at the plurality of second timestamps comprises,
      matching each of the plurality of first timestamps with one of the plurality of second timestamps, and
      matching the raw signal information at each of the plurality of first timestamps with the metadata information at the matched one of the plurality of second timestamps.

11. The method of claim 10 wherein, the single time source comprises one of:
   a network time protocol server; and
   a global positioning system time server.

12. The method of claim 9, wherein, the first digital file is synchronized in time with the second digital file by synchronizing the creation of the first digital file with the creation of the second digital file; and further comprising capturing a start time of the raw signal information in the first digital file.

13. The method of claim 9, further comprising:
   demodulating the digital signal to a baseband signal after using the analog-to-digital converter to convert the analog radio frequency signal to the digital signal; and
   storing the first digital file in a computer storage device, wherein the first digital file comprises information related to the baseband signal.

14. The method of claim 9, wherein,
   the first digital file comprises the raw signal information corresponding to the converted analog radio frequency signal; and
   the second digital file comprises the metadata information corresponding to the digital signal.

15. The method of claim 9, wherein creating the second digital file comprises:
   capturing one or more data packets in the digital signal;
   decoding at least one data packet of the one or more data packets;
   obtaining at least one of packet structure and payload information from the at least one data packet; and
   storing the at least one of the packet structure and the payload information in the second digital file.

16. The method of claim 15, wherein,
   the raw signal information comprises radio frequency signal burst data;
   the at least one of the packet structure and the payload information comprises the metadata information;
   the metadata information associated with each of the one or more data packets comprises a timestamp and a packet type; and
   creating the labeled radio frequency dataset based at least in part on the correlating, wherein the labeled radio frequency dataset comprises the raw signal information from the first digital file with the time-associated metadata information from the second digital file, comprises,
      creating a signal snapshot for each timestamp, wherein the signal snapshot comprises,
         the packet type, and
         the radio frequency signal burst data.

17. The method of claim 16, wherein the signal snapshot is created for each radio frequency signal burst data in the analog radio frequency signal.

18. A non-transitory tangible processor-readable storage medium encoded with instructions stored thereon which, when executed by at least one processor, cause the at least one processor to perform a method for automatically generating a labeled radio frequency signal dataset, the method comprising:
   receiving an analog radio frequency signal;
   converting the analog radio frequency signal to a digital signal;
   creating a first digital file, wherein the first digital file comprises:
      raw radio frequency signal burst data corresponding to the converted radio frequency signal, and
      a plurality of first timestamps associated with the raw radio frequency signal burst data;
   creating a second digital file corresponding to the converted radio frequency signal, wherein,
      the second digital file comprises information related to a plurality of packets,
      each of the plurality of packets comprises one of a plurality of second timestamps and a label; and
   creating the labeled radio frequency signal dataset by,
      identifying the one of the plurality of second timestamps associated with each of the plurality of first timestamps, and
      associating the label at each identified one of the plurality of second timestamps with the raw radio frequency signal burst data at each of the plurality of first timestamps.

* * * * *